United States Patent [19]

Fujimura et al.

[11] Patent Number: 4,745,433
[45] Date of Patent: May 17, 1988

[54] IMAGE FORMING APPARATUS WITH A LIGHT SHUTTER OF THE G-H TYPE LIQUID CRYSTAL

[75] Inventors: Koh Fujimura; Hisashi Aoki, both of Tokyo, Japan

[73] Assignee: Casio Computer Co., Ltd., Tokyo, Japan

[21] Appl. No.: 630,957

[22] Filed: Jul. 16, 1984

[30] Foreign Application Priority Data

Jul. 22, 1983 [JP] Japan ................. 58-132915

[51] Int. Cl.⁴ ................................... G03G 15/00
[52] U.S. Cl. .................... 355/3 R; 355/71; 350/331 R; 346/160
[58] Field of Search ............. 355/3 R, 71, 14 E; 350/331 R, 346, 349, 350 R; 346/153.1, 160; 358/300; 534/577

[56] References Cited

U.S. PATENT DOCUMENTS

| | | | |
|---|---|---|---|
| 3,551,026 | 12/1970 | Heilmeier | 350/349 |
| 3,824,604 | 7/1974 | Stein . | |
| 4,050,814 | 9/1977 | McFadden | 355/71 |
| 4,128,313 | 12/1978 | Cole, Jr. et al. | 350/349 X |
| 4,236,155 | 11/1980 | Nagata . | |
| 4,297,022 | 10/1981 | Lester | 355/3 R |
| 4,337,999 | 7/1982 | Funada | 350/349 X |
| 4,386,836 | 6/1983 | Aoki et al. | 355/3 R |
| 4,493,532 | 1/1985 | Kaneko et al. | 350/349 |
| 4,589,732 | 5/1986 | Shiraishi et al. | 355/3 R X |
| 4,591,886 | 5/1986 | Umeda et al. | 358/300 X |

FOREIGN PATENT DOCUMENTS 0083253  6/1983  European Pat. Off. .

OTHER PUBLICATIONS

International Handbook of Liquid Crystal Displays 1975-76 by Martin Tobias, Second Edition, with 1976 Supplement.
Alphanumeric Displays (Devices, Drive Circuits & Applications) G. F. Weston and R. Bittleston.
State of the Art—Displays (8181 New Electronics vol. 15 (1982) June, No. 12, London, Great Britain.

Primary Examiner—R. L. Moses
Assistant Examiner—J. Pendegrass
Attorney, Agent, or Firm—Frishauf, Holtz, Goodman & Woodward

[57] ABSTRACT

An image forming apparatus has a guest-host effect liquid crystal cell as a liquid crystal shutter which is arranged between a light source and a photosensitive drum to form a latent image on the photosensitive drum in accordance with a predetermined image obtained by light rays from the light source.

9 Claims, 9 Drawing Sheets

FIG. 11(J) SG3−COM1

FIG. 11(K) SG3−COM2

FIG. 11(L) SG.4
FIG. 11(M) SG4-COM1
FIG. 11(N) SG4-COM2

IMAGE FORMING APPARATUS WITH A LIGHT SHUTTER OF THE G-H TYPE LIQUID CRYSTAL

BACKGROUND OF THE INVENTION

The present invention relates to an image forming apparatus for forming an image on a photosensitive body by using a liquid crystal shutter comprising a guest-host effect type liquid crystal cell and for transcribing the image to a recording medium.

A conventional apparatus having a liquid crystal cell as a shutter is known as an electrophotographic printer described in U.S. Pat. No. 4,386,836. According to this electrophotographic printer, light from a light source irradiates a uniformly charged photosensitive drum upon energization of a charger through a twisted nematic mode liquid crystal cell (to be referred to as a TN liquid crystal cell hereinafter), and so forms a latent image corresponding to an image of a document on the photosensitive drum. The latent image is developed and transcribed to the recording medium.

Figure 1:
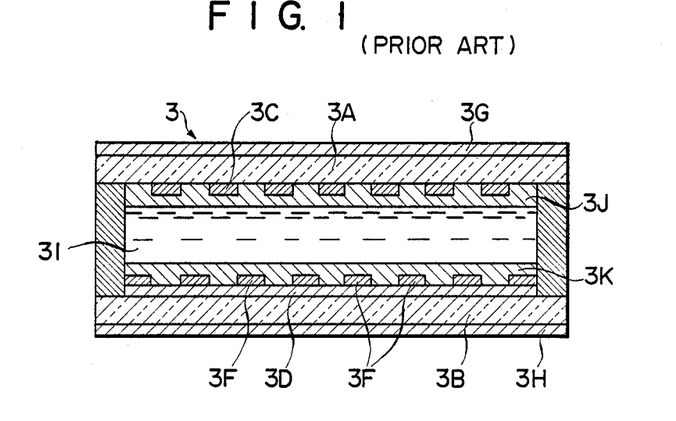
FIG. 1 is a sectional view showing the construction of a conventional TN liquid crystal cell.
Figure 2:
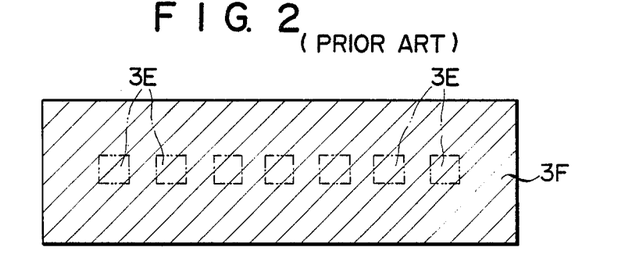
FIG. 2 is a plan view showing shutter portions and a mask of the conventional TN liquid crystal cell of FIG. 1.
Figure 3:
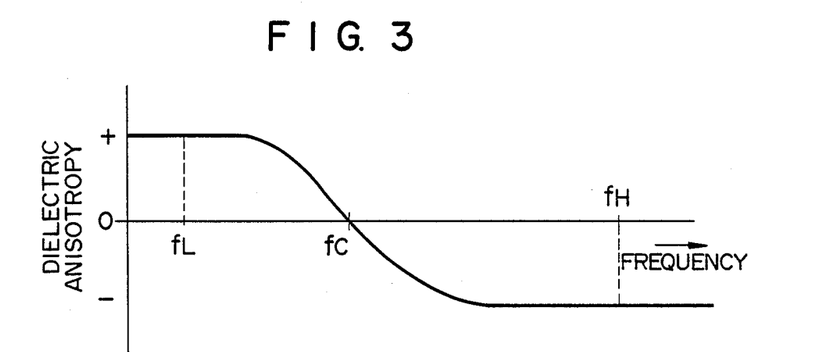
FIG. 3 is a graph showing the relationship between the dielectric anisotropy and the frequency of a conventional double-frequency driven liquid crystal.

The TN liquid crystal cell has the structure as shown in FIG. 1. Two glass substrates 3A and 3B are opposite to each other, and transparent electrodes 3C and 3D are respectively formed on the inner surfaces of the opposing glass substrates. In this case, the transparent electrodes 3C serve as signal or segment electrodes, and the transparent electrode 3D on the glass substrate 3B serves as a common electrode. Opaque electrodes 3F made of a metal such as chrominum are formed on the transparent electrode 3D. An aligning film 3J is formed on exposed portions of the glass substrate 3A and the transparent electrodes 3C. An aligning film 3K is formed on the exposed portions of the transparent electrode 3D and the opaque metal electrodes 3F. A polarizing plate 3G is formed on the outer surface of the glass substrate 3A. Similarly, a polarizing plate 3H is formed on the outer surface of the glass substrate 3B. The polarizing plates 3G and 3H constitute crossed nicols. A double-frequency driven liquid crystal 3I is sealed in a space between the aligning films 3J and 3K, thereby preparing a liquid crystal shutter. When a voltage of low frequency is applied across the electrodes 3C and 3D through the liquid crystal 3I, light is not transmitted through the electrodes 3C and 3D, so that the portions indicated by reference numeral 3E serve as shutters, as shown in FIG. 2. The liquid crystal shutter has the double-frequency driven liquid crystal whose dielectric anisotropy is inverted at a frequency fC, as shown in FIG. 3. The double-frequency driven liquid crystal comprises a nematic liquid crystal whose cross over frequency fC (at which the dielectric anisotropy becomes zero) is less than 100 kHz at ordinary temperature. This nematic liquid crystal contains an optically active substance. The direction of dielectric anisotropy is positive at a frequency fL which is lower than the cross over frequency fC. The direction of dielectric anisotropy becomes negative at a frequency fH which is higher than the cross over frequency fC. In the double-frequency driven liquid crystal having the property described above, when a low-frequency (fL) voltage is applied across the electrodes, the liquid crystal molecules are aligned parallel to the direction of an electric field. However, when a high-frequency (fH) voltage is applied across the electrodes, the molecules are aligned perpendicular to the direction of the electric field. Since the polarizing plates 3G and 3H are arranged such that their polarizing axes are orthogonal to each other, the shutter portions 3E shield light when the low-frequency (fL) voltage is applied across the electrodes. However, the shutter portions 3E transmit light when the high-frequency (fH) voltage is applied across the electrodes.

In the liquid crystal shutter having the construction described above, the hatched portion in FIG. 2 can always transmit light. The light component from the hatched portion irradiates the photosensitive drum, which disables the formation of a desired latent image thereon. In order to solve this problem, a mask is used to cover the hatched portion. However, manufacture of the mask complicates the fabrication process, and the construction of the liquid crystal shutter also becomes complicated. In particular, when the mask is prepared by using an opaque electrode made of a metal such as chrominum, the opposing area between the mask electrode and the lead electrode is increased, and the capacitance therebetween is increased. As a result, the power consumption of the liquid crystal shutter is increased, resulting in an economical disadvantage.

In addition, the TN liquid crystal cell used in the conventional electrophotographic printer contains an optically active substance such as a chiral nematic liquid crystal so as to shorten the response time. This leads to the following drawback. Optically active substance is contained in the TN type cell, so that the liquid crystal molecules are twisted by between about 270 degrees and 450 degrees. The twist angle changes in accordance with a gap between the glass substrates of the liquid crystal cell. High-precision control of the twist angle is therefore demanded. In addition, when the liquid crystal molecules are twisted and applied with a voltage, and the molecular axes of the liquid crystal are homogeneously to the direction of the electric field, the response time of the cell is short. However, when the liquid crystal molecules are deenergized and returned to the initial alignment, the cell has a long response time. In other words, the response time for turning off the microshutter includes a time delay for twisting the liquid crystal molecules.

Furthermore, since the twist angle of the liquid crystal molecules is as large as 270 degrees to 450 degrees, the vibration plane of light transmitted through the cell which light has been polarized by one polarizing plate is turned in accordance with the twist angle. Since the cell has a large twist angle, light scattering becomes large, thereby decreasing the contrast. For this reason, a high-intensity light source must be used under the assumption that light is greatly scattered. In addition to this disadvantage, when a temperature of the liquid crystal material changes, the twist angle of the liquid crystal molecules also changes, thereby destabilizing the contrast and the response time. Therefore, a temperature control device must be used to precisely control the temperature of the liquid crystal cell.

SUMMARY OF THE INVENTION

It is an object of the present invention to provide a simple image forming apparatus which eliminates the drawbacks of the conventional liquid crystal shutter having a liquid crystal cell, and which can be easily fabricated.

It is another object of the present invention to provide an image forming apparatus capable of forming an image at high speed.

It is still another object of the present invention to provide an image forming apparatus for providing a high-contrast image using a low-intensity light source.

It is still another object of the present invention to provide an image forming apparatus which has a wide application temperature range.

In order to achieve the above objects of the present invention, there is provided an image forming apparatus comprising: a light source; photosensitive means operated such that that portion of a charged surface thereof which is exposed with light from a light source is charged; exposing means, arranged between said light source and said photosenstive means, for forming a desired image upon exposure by light from said light source and for forming a latent image corresponding to the desired image on said photosensitive means, said exposing means comprising a guest-host effect liquid crystal cell, said guest-host effect liquid crystal cell including a pair of opposing substrates, electrodes formed on inner surfaces of said pair of opposing substrates, respectively, aligning films formed on exposed portions of the inner surfaces of said pair of opposing electrodes and said electrodes, respectively, and a liquid crystal which contains a dichroic dye and is sealed between said aligning films; developing means for developing the latent image formed on said photosensitive means to a visible image; recording means for transcribing the visible image from said photosensitive means to a recording medium; and cleaning means for cleaning said photosensitive means after the visible image is transcribed to the recording medium.

In the image forming apparatus having the above configuration according to the present invention, a so-called normally OFF type of guest-host effect liquid crystal cell (to be referred to as a G-H effect liquid crystal cell hereinafter) is used as the exposing means and does not transmit light when an electric field is not applied to the liquid crystal molecules. In this manner, a portion excluding the microshutter portion does not normally transmit light. Unlike the conventional TN liquid crystal cell, the mask need not be prepared, thereby simplifying the manufacturing process.

In such a G-H effect liquid crystal cell, unlike in the conventional TN liquid crystal cell, no optically active substance need be contained to twist the liquid crystal molecules. The gap between the substrates which greatly influences the twist angle need not be precisely controlled, thereby simplifying the fabrication process. In addition, light scattering caused by the twist angle does not occur, and thus a high-contrast image can be formed. The molecules of the G-H effect liquid crystal cell are subjected to homogeneous alignment for aligning the molecules parallel to the opposing substrate surfaces and homeotropic alignment for aligning the molecules perpendicular to the opposing substrate surfaces. The delay time for twisting the TN liquid crystal molecules can be omitted, thereby shortening the response time in the G-H effect liquid crystal cell. As a result, the image can be formed at high speed. In addition, since the G-H effect liquid crystal cell is used, the range of the wavelength of light from the light source, the range of peak absorbing wavelength of the liquid crystal, and the range of wavelength of the photosensitive drum can easily be matched with each other, so that a greater light transmission amount ratio is involved between when under control the light is not transmitted through the liquid crystal cell and under control the light is transmitted therethrough. The latent image can be formed even if a normal light source such as a fluorescent lamp is used. In addition, in the G-H effect liquid crystal cell, unlike in the TN liquid crystal cell, the molecules are not twisted. As a result, the twist angle will not change in accordance with changes in temperature, thereby providing stable operation.

DETAILED DESCRIPTION OF THE PREFERRED EMBODIMENTS

An image forming apparatus according to an embodiment of the present invention will be described with reference to the accompanying drawings.

Figure 4:
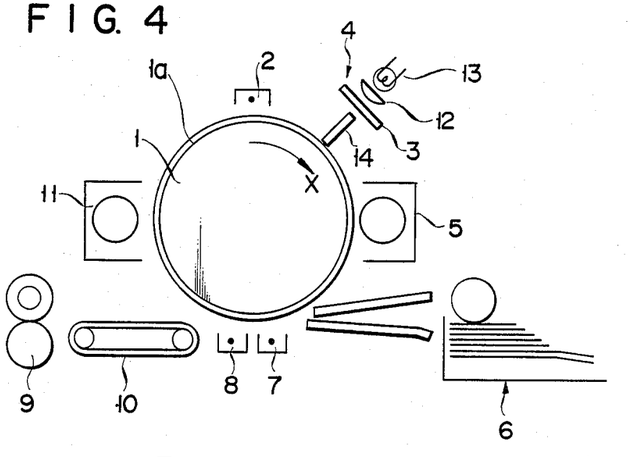
FIG. 4 is a schematic view showing the overall configuration of an image forming apparatus according to an embodiment of the present invention.

FIG. 4 shows the schematic configuration of the image forming apparatus for forming an image on a photosensitive drum by using a liquid crystal shutter. A charging means 2 is arranged immediately above a photosensitive drum 1 with a photosensitive layer 1a on its outer peripheral surface to positively charge the photosensitive layer 1a on the surface of the photosensitive drum 1. An exposing unit 4 for forming a latent image by using a liquid crystal shutter 3, a developing unit 5 for applying a toner to the latent image on the surface of the photosensitive drum 1 to form a visible or toner image, a transcriber unit 7 for transcribing a toner image to a paper sheet fed from a paper feed cassette 6, a separator 8 for separating the paper sheet from the photosensitive drum 1, a belt conveyor 10 for conveying the separated paper sheet toward a fixing roll 9, and a cleaning unit 11 for cleaning the residual toner particles left on the photosensitive drum 1 are sequentially arranged along the direction indicated by arrow X. The exposing unit 4 has a focusing lens 12 and a fluorescent lamp 13 as a light source, in addition to the liquid crystal shutter 3. In addition, a rod-like lens array 14 having a short focal length is arranged between the photosensitive drum 1 and the liquid crystal shutter 3.

The liquid crystal shutter will be described in detail with reference to FIGS. 5 and 6. A liquid crystal shutter 21 comprises a liquid crystal prepared such that a dichroic dye (as a guest) having a peak absorbing wavelength range corresponding to the maximum emission wavelength range of the light source 13 is dissolved into a liquid crystal (as a host), thereby constituting a guest-host effect type liquid crystal cell 22 utilizing light absorbing anisotropy. Transparent electrodes 25 and 26 are formed on the inner surfaces of opposing glass substrates 23 and 24, respectively. In this case, the transparent electrodes 25 on the glass substrate 23 serve as signal electrodes, respectively, and the transparent electrode 26 on the glass substrate 24 serves as the common electrode. Aligning films 27 and 28 are subjected to rubbing along opposing directions so as to homogeneously align the liquid crystal molecules when the liquid crystal is sealed therebetween. The liquid crystal cell 22 has only one polarizing plate 29 formed on the outer surface of the glass substrate 23 on the light incident side thereof. The polarization axes of the polarizing plate 29 is set to coincide with the rubbing directions of the aligning films 27, 28. A liquid crystal 30 comprises a double-frequency driven liquid crystal containing a dichroic dye additive. When a voltage is applied across the electrodes of the liquid crystal cell 22, the major axes of the liquid crystal molecules H change in direction and the major axes of dye molecules G also change in direction. In this case, the dye molecules G have a larger polarized component absorption rate along the major axes thereof and a lower rate along any other direction. Therefore, the light components of specific wavelengths can be transmitted/shielded corresponding to the optical property of the dye molecules G.

Figure 5:
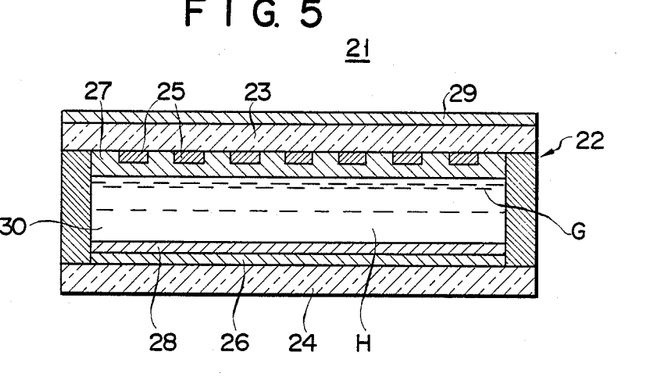
FIG. 5 is a sectional view of a G-H liquid crystal cell used in the apparatus shown in FIG. 4.
Figure 6:
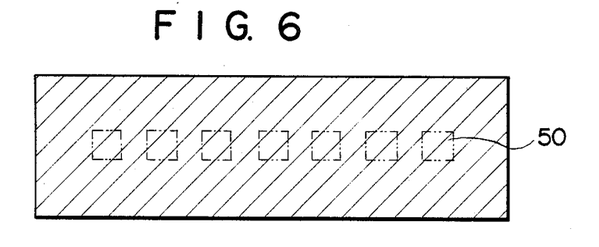
FIG. 6 is a plan view of shutter portions in the G-H liquid crystal cell shown in FIG. 5.

In the liquid crystal shutter having the construction shown in FIG. 5, portions 50 corresponding to opposing portions between the electrodes 25 and 26 serve as shutter portions, as shown in FIG. 6.

An example of the shutter effect was tested by using the liquid crystal shutter 21 described above. The test was made under the following conditions. The photosensitive wavelength range of the photosensitive body (photosemiconductor) which forms an electrostatic latent image corresponding to the light transmitted from the liquid crystal shutter 21 was 470 to 600 nm. A peak of the photosensitive wavelength was 550 to 575 nm. A light source was selected in accordance with the range described above and comprised a fluorescent lamp having a peak emitting wavelength of 543 nm (green). The liquid crystal 30 having a peak absorbing wavelength of 552 nm was selected in accordance with the peak emitting wavelength. The liquid crystal 30 was prepared, by dissolving, in a double-frequency driven liquid crystal ZLI-2461 (tradename) available from Merck & Co., Inc., 1.5% by weight of a dichroic dye having the following formula:

As a voltage waveform to be applied between the electrodes opposed through the liquid crystal 30 use was made of a double-frequency voltage having a high frequency fH and a low frequency fL of 200 kHz and 3.3 kHz, respectively. The voltage $V_0$ of the doublefrequency signal was 30 V. The high frequency (fH) and low frequency (fL) voltages were repeatedly switched at intervals of 1 msec so as to check the switching time.

Figure 7:
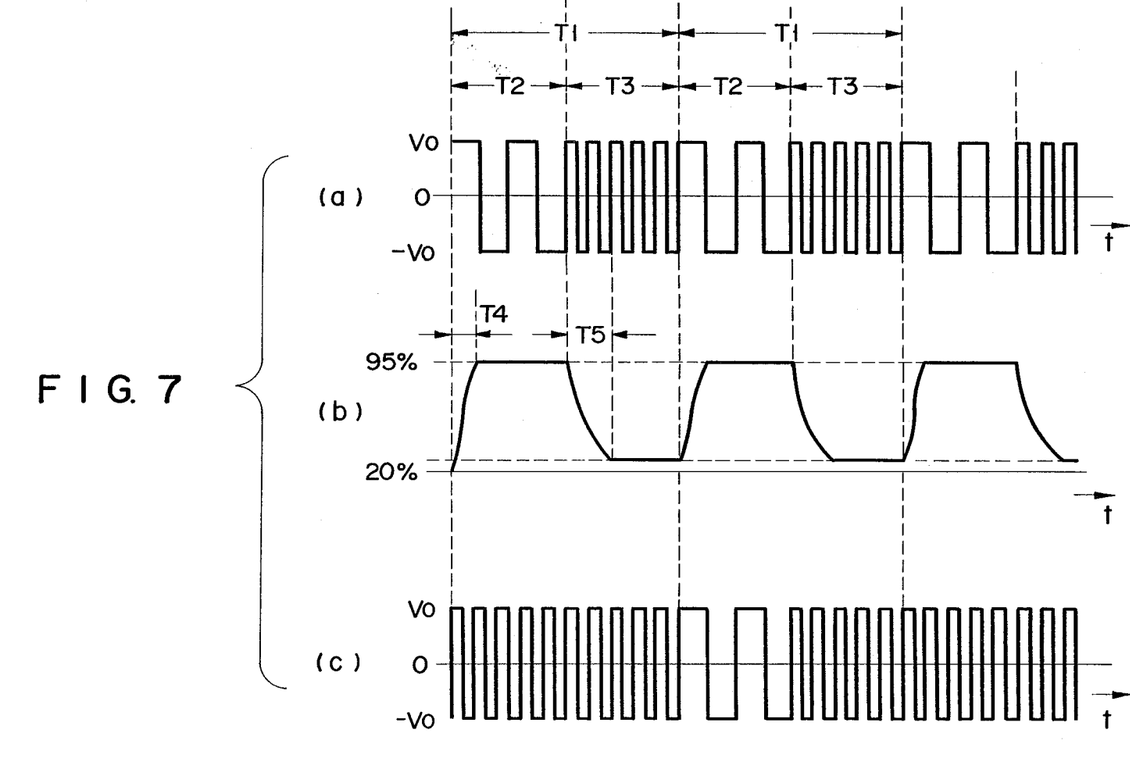
FIG. 7(a) shows a fundamental waveform of a signal voltage applied across the electrodes of the G-H liquid crystal cell shown in FIG. 5.
FIG. 7(b) shows the openings of the shutter portions which transmit light upon application of the voltage shown in FIG. 7(a)
FIG. 7(c) shows a waveform of a voltage actually applied across the electrodes of the G-H liquid crystal cell shown in FIG. 5.

As compared with the case wherein only the high frequency (fH) voltage or the low frequency (fL) voltage was applied across the electrodes, the transmittances were 95% (maximum) and 20% (minimum) as shown in FIG. 7(b) when the fH and fL voltages were alternately applied across the electrodes, as shown in FIG. 7(a). More particularly, FIG. 7(a) shows a fundamental waveform used to alternately apply the fH and fL voltages to the electrodes. Reference symbol T1 denotes a time (i.e., 2 msec) required for writing one dot-line; T2, a time (i.e., 1 msec) during which the fL voltage is applied; and T3, a time (i.e., 1 msec) during which the fH voltage is applied. FIG. 7(b) shows the transmittances of light components in response to the voltage shown in FIG. 7(a). When the fH voltage is applied across the electrodes, the shutter 50 is turned off. However, when the fL voltage is applied, the shutter 50 is turned on. The transient time T4 for a leading edge is 0.2 msec, and the transient time T5 for a trailing edge is 0.4 msec. As a result, the response time can be greatly shortened, and thus the on/off speed of the shutter is increased.

FIG. 7(c) shows the waveform of a voltage actually applied across the electrodes 25, 26 in FIG. 5. In a case wherein writing is performed for first and third dot-lines but writing is not performed for the second dot-line, the liquid crystal shutter 21 is turned off in the first line, turned on in the second line and turned off in the third line. This operation is performed by the voltage of the waveform shown in FIG. 7(c).

According to this embodiment, the liquid crystal shutter 21 comprises the guest-host effect type liquid crystal cell 22 and is driven in accordance with the double-frequency driving method. As a result, the liquid crystal shutter 21 can be opened and closed at a high speed. In addition, the aligning films 27 and 28 are rubbed to homogeneously align the liquid crystal molecules when the liquid crystal is injected therebetween, and the single polarizing plate 29 is formed on the glass substrate 23 such that the polarization axis is set to coincide with the rubbing direction in which the alignment is made, thereby obtaining high contrast. In addition to this advantage, it is easy to substantially match the peak absorbing wavelength of the dichroic dye with the peak wavelength of the light source, thereby obtaining higher contrast. Furthermore, since the guest-host effect type liquid crystal cell is used to eliminate the mask shown in FIG. 2, the cell construction can be simplified, and only one polarizing plate is required, thereby lowering the manufacturing cost.

Another liquid crystal shutter used in the image forming apparatus according to the present invention will be described hereinafter.

Figure 8:
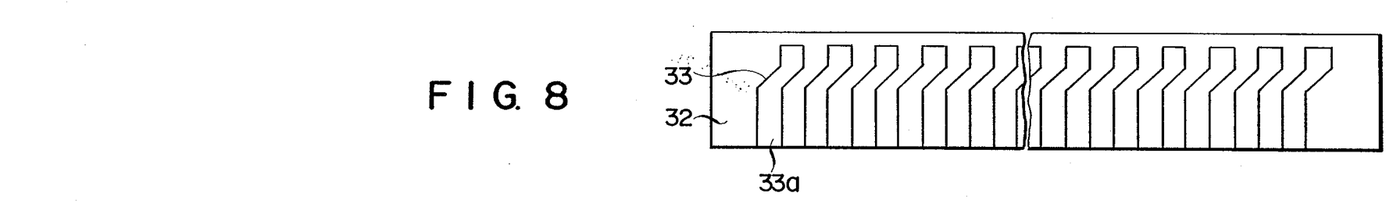
FIG. 8 is a schematic view showing the arrangement of the shutter portions and electrodes of another liquid crystal shutter used in the present invention, and the connection between the shutter portions and electrodes, and a drive circuit.
Figure 9:
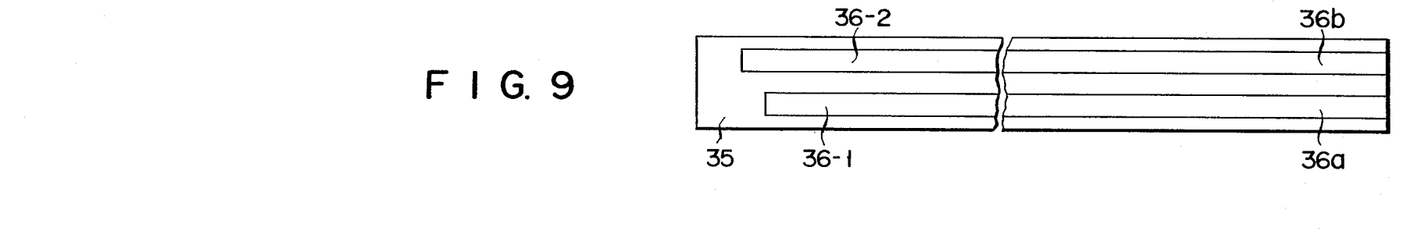
FIG. 9 is a schematic view showing a plurality of signal electrodes formed on a lower substrate of the liquid crystal shutter shown in FIG. 8.
Figure 10:
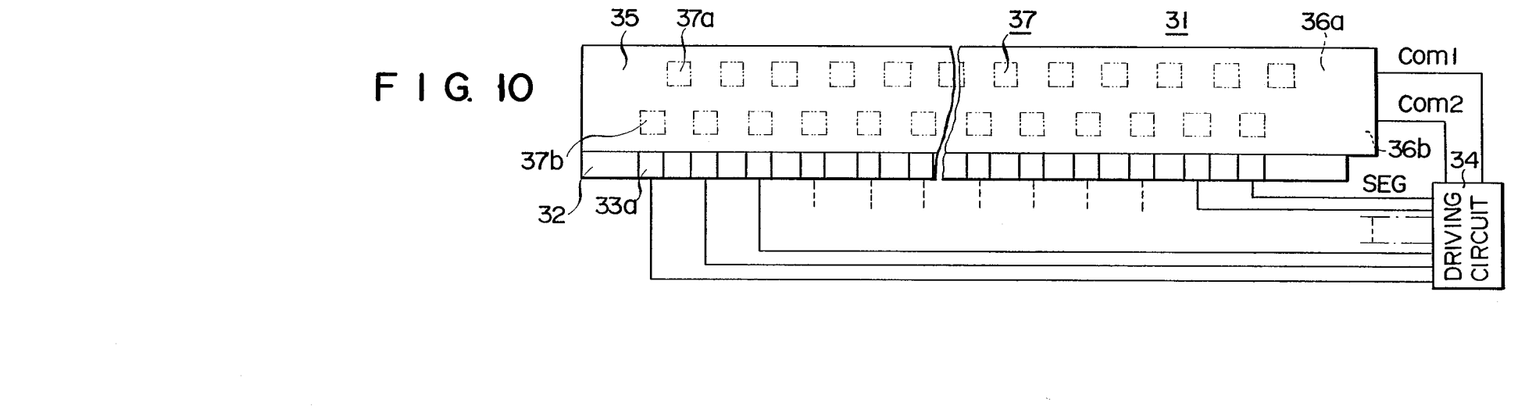
FIG. 10 is a schematic view showing the arrangement of two common electrodes formed on an upper substrate of the liquid crystal shutter of FIG. 8.

As shown in FIG. 8, a plurality of signal electrodes 33 each of which is bent by ½ pitch are formed on the surface of a lower substrate 32 of the liquid crystal shutter. Two parallel common electrodes 36-1 and 36-2 are formed on an upper substrate 35 along the longitudinal direction thereof, as shown in FIG. 9. The surfaces of the upper and lower substrates 35 and 32 which have the electrodes thereon oppose each other, and a G-H liquid crystal is sealed therebetween, thereby obtaining a liquid crystal shutter 31, as shown in FIG. 10. Shutter portions 37a and 37b are aligned at intersections of the signal electrodes 33 and the common electrodes 36-1 and 36-2 in a staggered manner. Terminals 33a, 33b... of the respective signal electrodes are connected to a drive circuit 34 and receive the corresponding segment signals. On the other hand, common terminals 36a and 36b of the common electrodes 36-1 and 36-2 are connected to the drive circuit 34 and receive common signals COM1 and COM2, respectively. The liquid crystal shutter 31 is operated in synchronism with one revolution of the photosensitive drum 1 so as to optically form an image of a dotted line by using two arrays of the shutter portions 37a and 37b.

The formation of the latent image on the photosensitive drum will be described.

A latent image is formed by the transmitted light by selecting a desired dot of a plurality of parallel dot lines on the photosensitive drum. The selection of the desired dot is performed such that the first array of a plurality of the shutter portions 37a and the second array of a plurality of the shutter portions 37b shown in FIG. 10 are driven in a time-division manner in synchronism with the revolution of the photosensitive drum, thereby forming the first dot line.

Liquid cyrstal shutter 31 of FIG. 10 is a modification of liquid crystal shutter 3 of FIG. 4. Liquid crystal shutter 31 comprises a group of shutter portions 37a arranged in every other dot and another group of shutter portions 37b also arranged in every other dot. These two groups of shutter portions 37a and 37b are arranged in two stages and in a staggered manner.

When the first stage shutter portions 37a are open, the second stage shutter portions 37b are closed, and vice versa.

An electrostatic latent image is formed line by line on a drum rotating in one direction in the following manner.

First, the first stage shutter portions 37a are opened for 1 msec. During this 1 msec period, only the latent image of every other dot in a complete single line image is formed. The drum keeps rotating even during the 1 msec period, so at the end of the period the latent image of the first line comes to the positions on the line of the second stage shutter portions 37b, which are located between the associated first stage shutter portions 37a.

During the subsequent 1 msec perios, shutter portions 37a are closed and the second stage shutter portions 37b are open. Consequently, the latent image of the dot positions corresponding to shutter portions 37b can be formed; that is, shutter portions 37b form the latent image left out by shutter portions 37a in the preceding step, thus providing the entire latent image of the first line.

During the next 1 msec, shutter portions 37a are again opened (of course, shutter portions 37b are closed) to proceed to form the latent iamge of the second line, which is carried out by reacting the aforementioned steps for the first line.

The dot pattern of any dot line constituting the latent image is formed since the light from the light source is shielded and transmitted in accordance with the on/off operation of the shutter portions 37a and 37b. A drive signal corresponding to the information for an image to be formed is supplied from the drive circuit 34, and the shutter portions 37a and 37b are thereby controlled in the four control modes. These four control modes will be described below with reference to FIGS. 11(A) to 11(N).

Figure 11A:
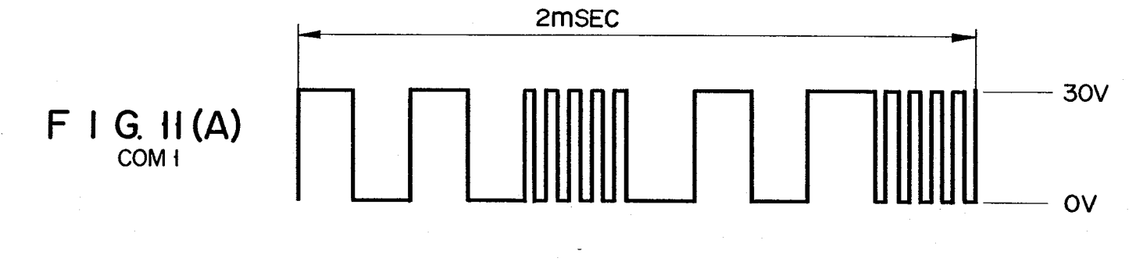
FIGS. 11(A) to 11(N) are timing charts for explaining the operation of the liquid crystal shutter according to the present invention.
Figure 11B:
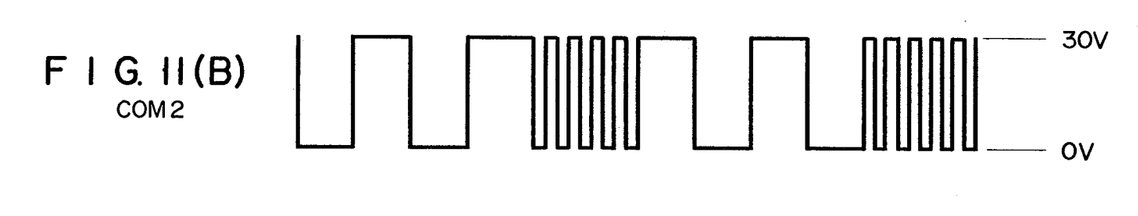

It should be noted that the drive circuit 34 generates the common signals COM1 and COM2 (as shown in FIGS. 11(A) and 11(B), respectively,) and segment signals SG1, SG2, SG3 and SG4 which comprise a low-frequency (fL) signal for opening the shutter portions 37a and 37b and a high-frequency (fH) signal for closing the shutter portions 37a and 37b. The common signals COM1, COM2 shown in FIGS. 11(A) and 11(B) which are output from the drive circuit 34 are constantly supplied to the terminals 36a and 36b of the common electrodes 36-1 and 36-2, respectively. One of the segment signals SG1, 2, 3 and 4 shown in FIGS. 11(c), 11(F), 11(I) and 11(L) which are output from the drive circuit 34 is selectively supplied to the terminal 33a of the signal electrode 33 in FIG. 10.

Figure 11C:
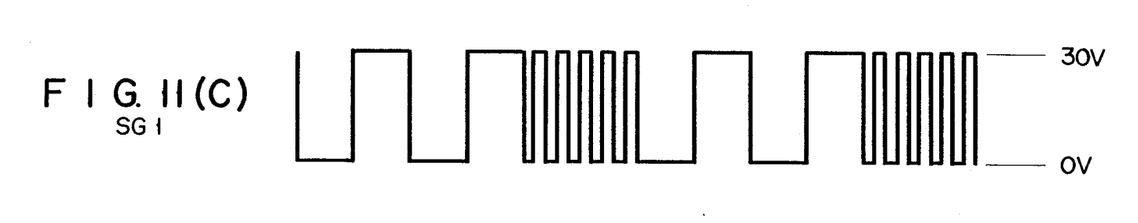
Figure 11D:
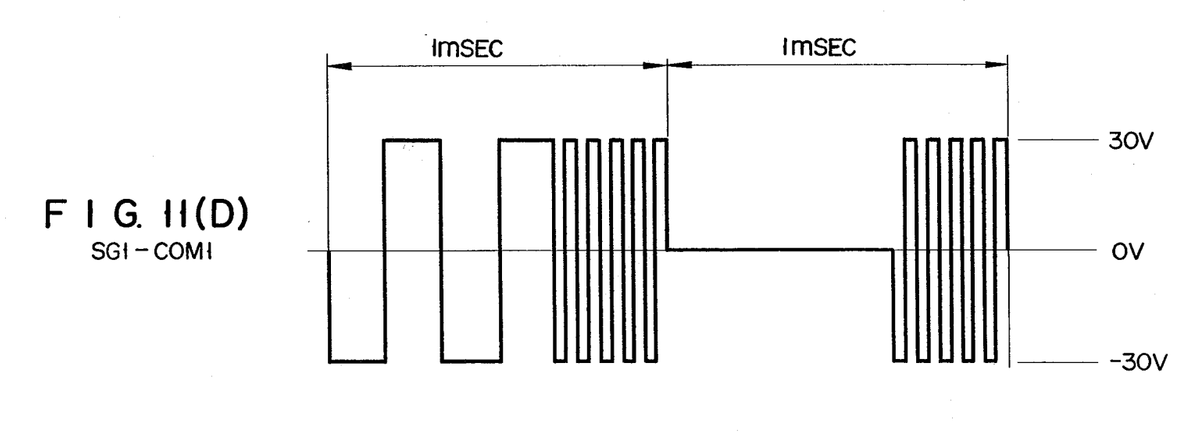
Figure 11E:
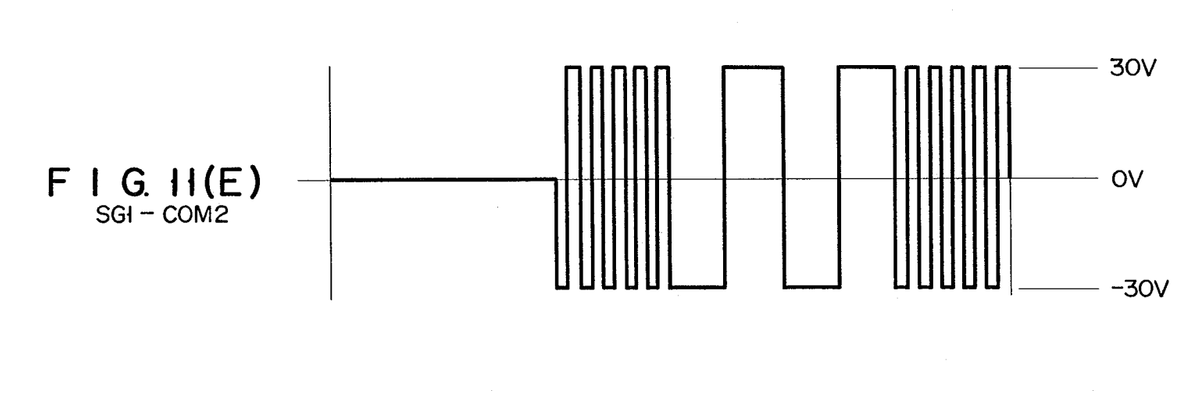

First, the drive circuit 34 supplies the segment signal SG1 shown in FIG. 11(C) to the signal electrode terminals 33a shown in FIG. 10. The voltage shown in FIG. 11(D) is applied across the signal electrode terminals 33a for controlling the opening and closing of the shutter portions 37a and the common electrode 36-1. On the other hand, the signal shown in FIG. 11(E) is applied across the signal electrode terminals 33a for controlling the opening and closing of the shutter portions 37b and the common electrode 36-2. In this case, each the shutter portions 37a and 37b is controlled in a time-division manner. Light is transmitted on the photosensitive drum, and dots constituting the latent image are not selected.

Second, an operation for opening the shutters 37a and closing the shutters 37b will be described.

Figure 11F:
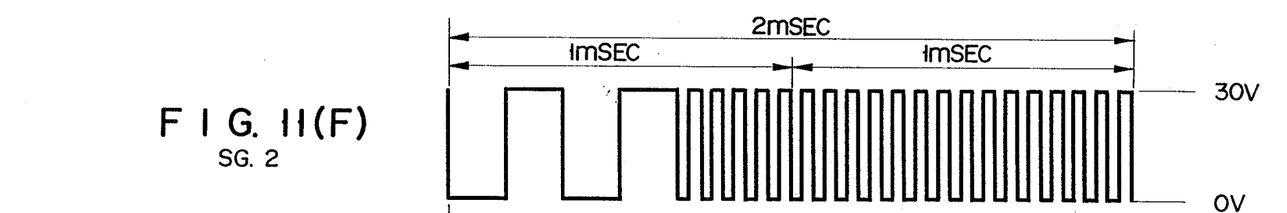
Figure 11G:
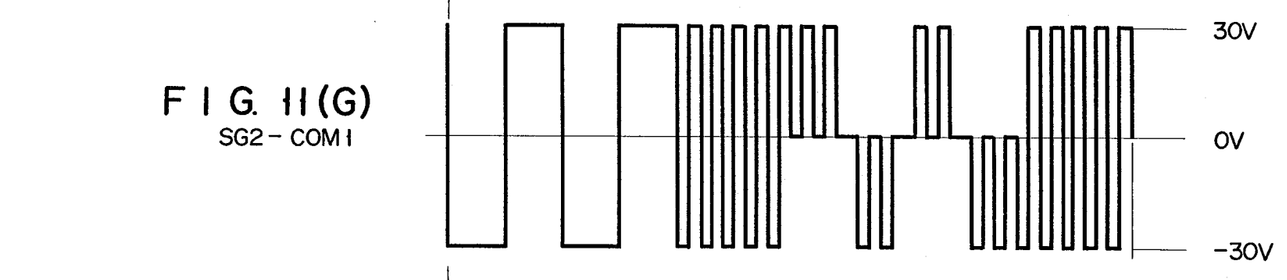
Figure 11H:
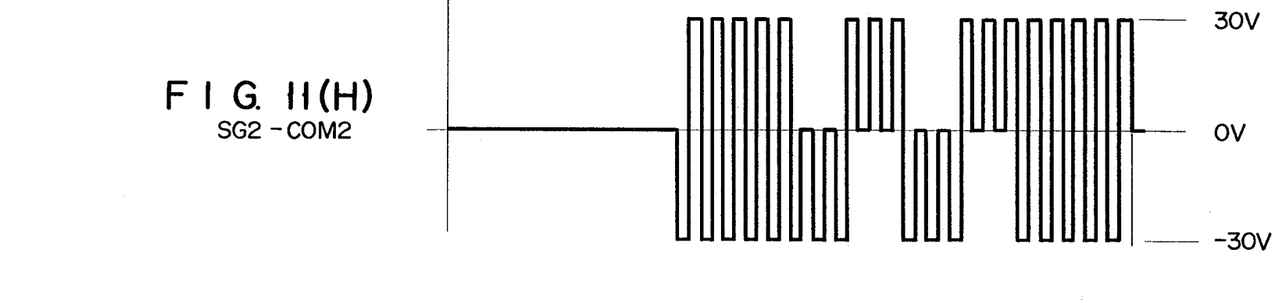

The segment signal SG2 shown in FIG. 11(F) is supplied from the drive circuit 34 to the signal electrode terminals 33a. A signal shown in FIG. 11(G) is supplied across the signal electrode terminals 33a and the common electrode 36-1 to open the shutter portions 37a. On the other hand, a signal shown in FIG. 11(H) is applied across the signal electrode terminals 33a and the common electrode 36-2 to close the shutter portions 37b. The dots corresponding to the opened shutter portions 37a are not formed, but the dots corresponding to the closed shutter portions 37b are selected for the latent image.

Third, an operation for closing the shutter portions 37a and opening the shutter portions 37b will be described.

Figure 11I:
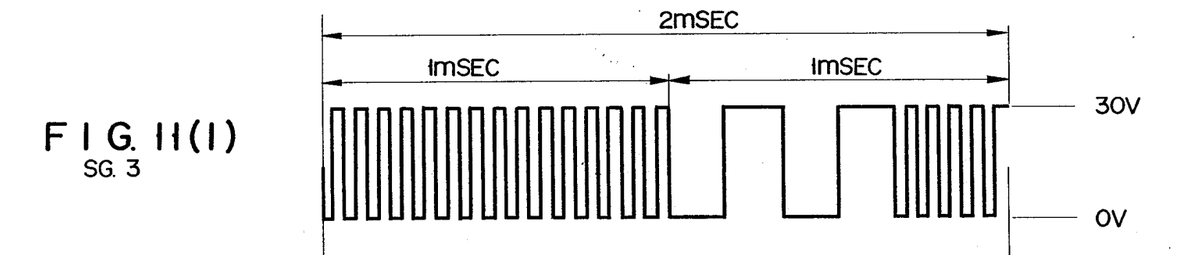
Figure 11J:
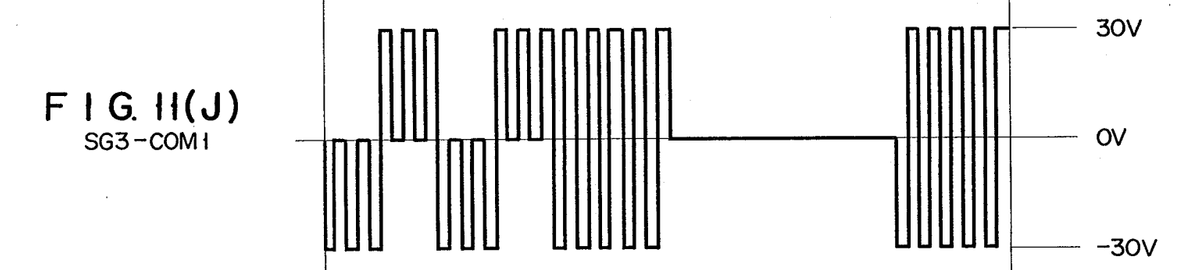
Figure 11K:
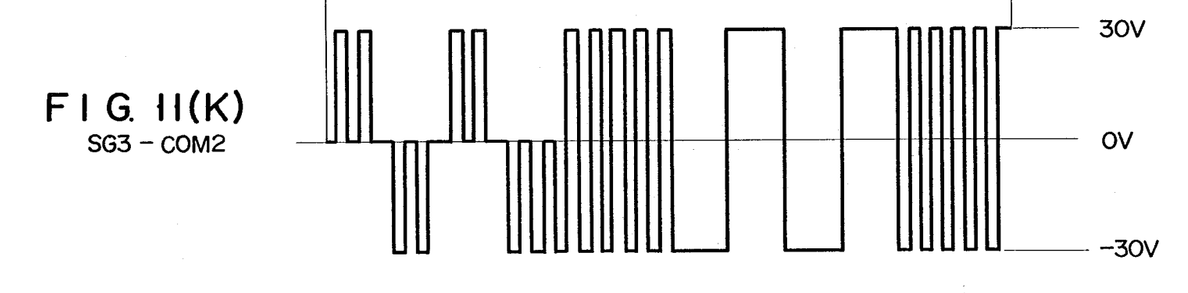

The segment signal SG3 shown in FIG. 11(I) is supplied from the drive circuit 34 to the signal electrode terminals 33a. The voltage shown in FIG. 11(J) is supplied across the signal electrode terminals 33a and the common electrode 36-1 to close the shutter portions 37a. On the other hand, the voltage shown in FIG. 11(K) is applied across the signal electrode terminals 33a and the common electrode 36-2 to open the shutter portions 37b. Therefore, unlike in the second operation, dots corresponding to the shutter portions 37a are selected for the latent image, and dots corresponding to the shutter portions 37b are not formed.

Fourth, an operation for closing both the shutter portions 37a and 37b will be described.

Figure 11L:
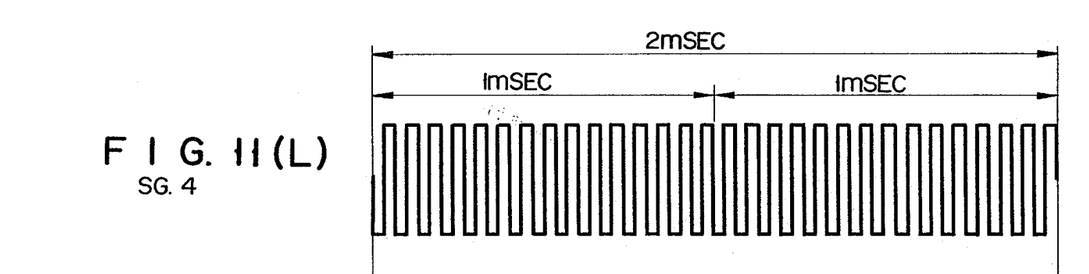
Figure 11M:
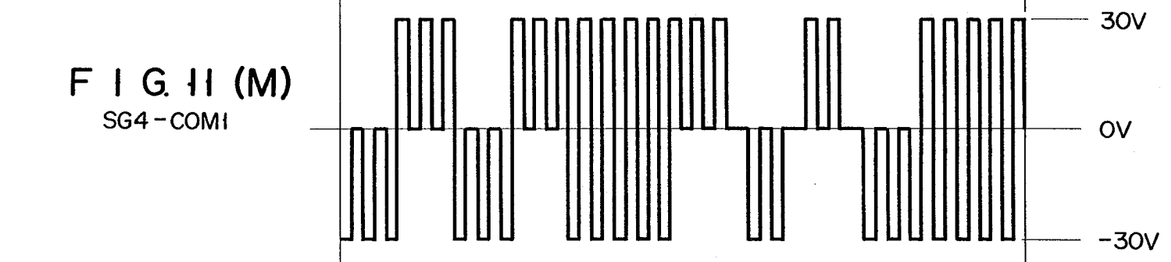
Figure 11N:
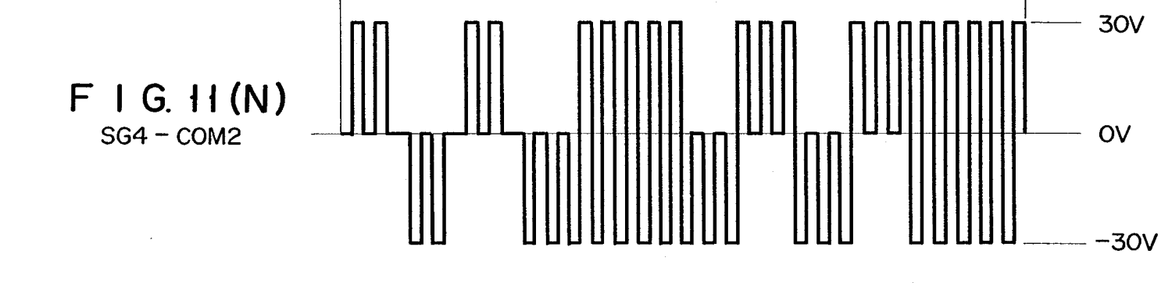

The segment signal SG4 shown in FIG. 11(L) is supplied from the drive circuit 34 to the signal electrode terminals 33a. A voltage shown in FIG. 11(M) is applied across the signal electrode terminals 33a and the common electrode 36-1 to close the shutter portions 37a. On the other hand, the voltage shown in FIG. 11(N) is supplied across the signal electrode terminals 33a and the common electrode 36-2 to close the shutter portions 37b. In this manner, the shutter portions 37a and 37b are both closed, and the dots corresponding to the portions 37a and 37b are selected for the latent image.

The on/off operation of the shutter portions 37a and 37b is performed in the above-mentioned four operation modes. The segment signals SG1 to SG4 are selected in accordance with the image information, thereby forming a predetermined latent image on the photosensitive drum.

What is claimed is:

1. An image forming apparatus comprising:
a light source;
photosensitive means operated such that a portion of a charged surface thereof which is exposed with light from said light source is discharged;
exposing means, arranged between said light source and said photosensitive means, for forming a desired image upon exposure by light from said light source and for forming a latent image corresponding to the desired image on said photosensitive means, said exposing means comprising a guest-host effect liquid crystal shutter, said guest-host effect liquid crystal shutter including a pair of opposing substrates, electrodes formed on inner surfaces of said pair of opposing substrates, respectively, to provide a plurality of electrically controllable shutter portions, aligning films formed on exposed portions of the inner surfaces of said pair of opposing substrates and said electrodes, respectively, and a frequency driven liquid crystal which contains a dichroic dye and is sealed between said aligning films, to form a liquid crystal layer, the molecules of said liquid crystal and said dichoric dye being homogeneously aligned, and a polarizing plate being arranged which has a polarization axis extending parallel to the longer axes of the molecules of said liquid crystal, said shutter shielding the light from said light source when a voltage is not applied across said electrodes, and said shutter passing the light from said light source when a voltage is applied across said electrodes;
developing means for developing the latent image formed on said photosensitive means to a visible image; and
recording means for transcribing the visible image from said photosensitive means to a recording medium.

2. An apparatus according to claim 1, wherein said recording means comprises: feeding means for feeding the recording medium; transcribing means for transcribing the visible image from said photosensitive means to the recording medium; fixing means for fixing the visible image on the recording medium; and conveying means for conveying the recording medium having the fixed visible image thereon.

3. An apparatus according to claim 1, wherein the electrodes in said guest-host effect liquid crystal shutter respectively comprise an array of a plurality of signal electrodes formed on one of said pair of opposing substrates and at least one opposing electrode formed on the other one of said pair of opposing substrates so as to sandwich the liquid crystal between said array and said opposing electrode, said signal electrodes and said opposing electrode serving as a light shutter when a voltage is applied therebetween.

4. An apparatus according to claim 3, wherein the liquid crystal comprises a liquid crystal material and a dichroic dye which is dissolved in said liquid crystal material and which has a maximum value of an absorbing wavelength in the peak absorbing wavelength range.

5. An apparatus according to claim 1, wherein the liquid crystal comprises a double-frequency driven liquid crystal operated such that a direction of dielectric anisotropy is negative when a high-frequency voltage is applied across said electrodes and that the direction of dielectric anisotropy is positive when a low-frequency signal is applied across said electrodes.

6. An apparatus according to claim 1, wherein the liquid crystal has a peak absorbing wavelength range corresponding to a peak emission wavelength range of said light source.

7. An apparatus according to claim 1, wherein the liquid crystal comprises a liquid crystal material and a dichroic dye which is dissolved in said liquid crystal material and which has a maximum value of an absorbing wavelength in the peak absorbing wavelength range.

8. An apparatus according to claim 1, wherein said light source has a peak emission wavelength range corresponding to a photosensitive wavelength range of said photosensitive means.

9. An apparatus according to claim 1, wherein said polarizing plate is provided on one of the outer surfaces of said pair of opposing substrates.

* * * * *

UNITED STATES PATENT AND TRADEMARK OFFICE
CERTIFICATE OF CORRECTION

PATENT NO. : 4,745,433

DATED : May 17, 1988

INVENTOR(S) : FUJIMURA et al.

It is certified that error appears in the above-identified patent and that said Letters Patent is hereby corrected as shown below:

Title page, right-hand column, "Foreign Patent Documents", insert -- DE 2711194 September 21, 1978, DE 3213872 filed November 4, 1982 --

Signed and Sealed this

Fourteenth Day of February, 1989

Attest:

DONALD J. QUIGG

Attesting Officer

Commissioner of Patents and Trademarks